(Model.)

E. W. FOWLER.
DEVICE FOR OPERATING SAFE BOLT WORK.

No. 403,527. Patented May 21, 1889.

6 Sheets—Sheet 1.

Witnesses
Albert H. Adams.
Harry T. Jones.

Inventor
Elbert W. Fowler.

(Model.) 6 Sheets—Sheet 2.
E. W. FOWLER.
DEVICE FOR OPERATING SAFE BOLT WORK.
No. 403,527. Patented May 21, 1889.
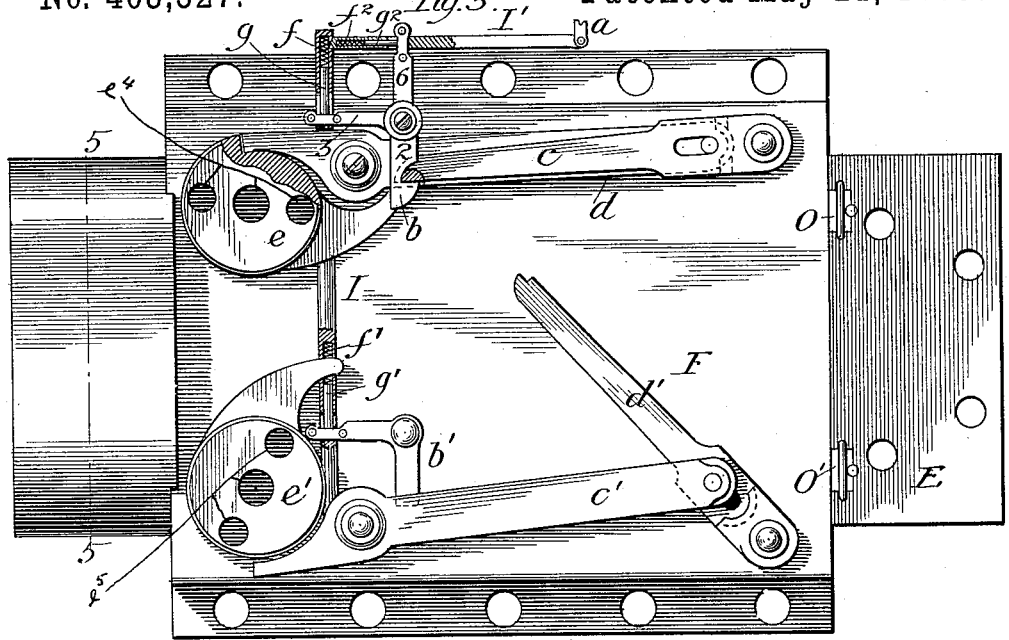
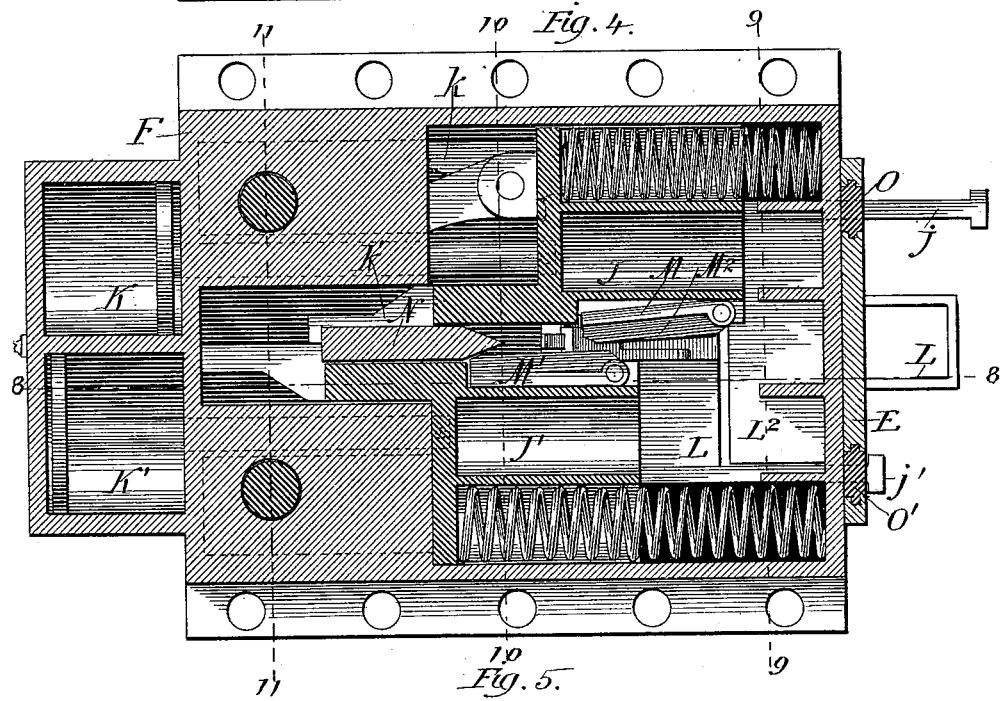
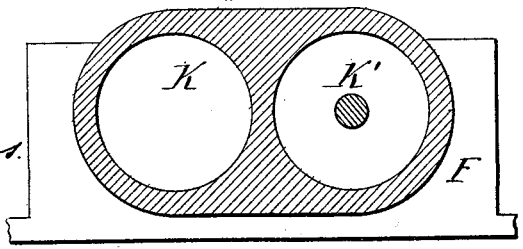
Witnesses:
Albert H. Adams
Harry T. Jones
Inventor:
Elbert W. Fowler (Model.)

E. W. FOWLER.
DEVICE FOR OPERATING SAFE BOLT WORK.

No. 403,527. Patented May 21, 1889.

Witnesses:
Albert H. Adams.
Harry T. Jones.

Inventor:
Elbert W. Fowler (Model.)
E. W. FOWLER.
DEVICE FOR OPERATING SAFE BOLT WORK.
No. 403,527. Patented May 21, 1889.
6 Sheets—Sheet 4.
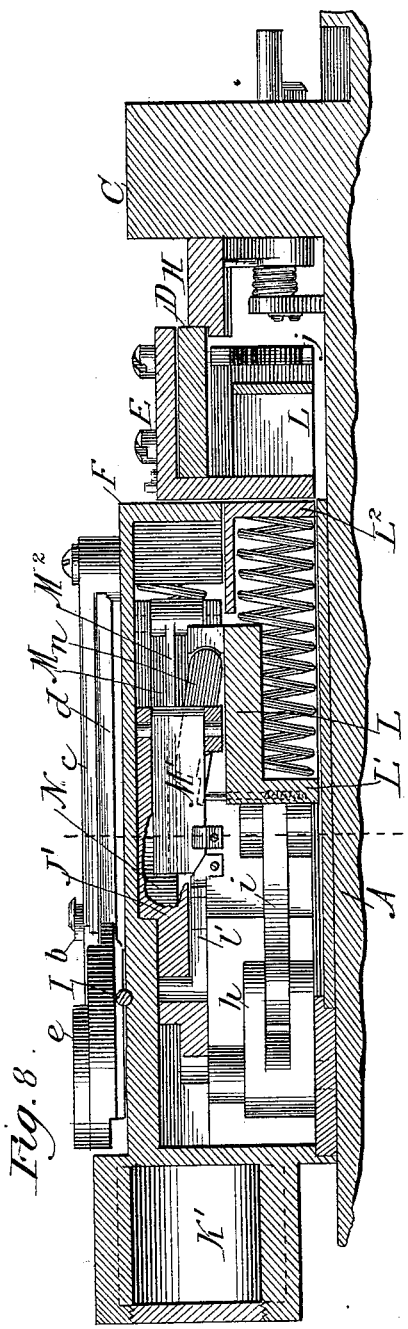
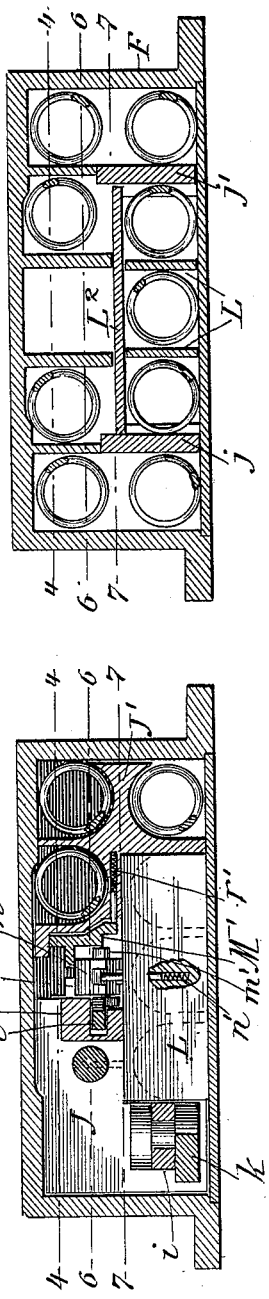
Witnesses:
Albert H. Adams.
Harry T. Jones.
Inventor:
Elbert W. Fowler.

(Model.)  6 Sheets—Sheet 5.
E. W. FOWLER.
DEVICE FOR OPERATING SAFE BOLT WORK.
No. 403,527. Patented May 21, 1889.
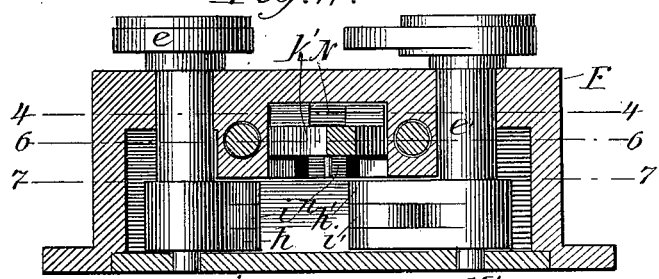
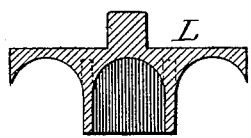
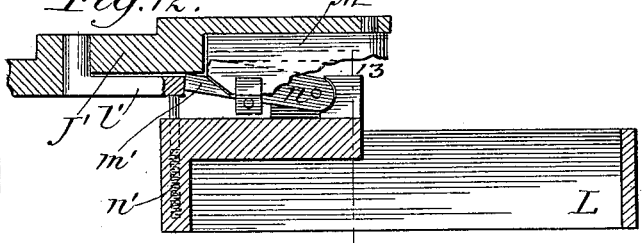
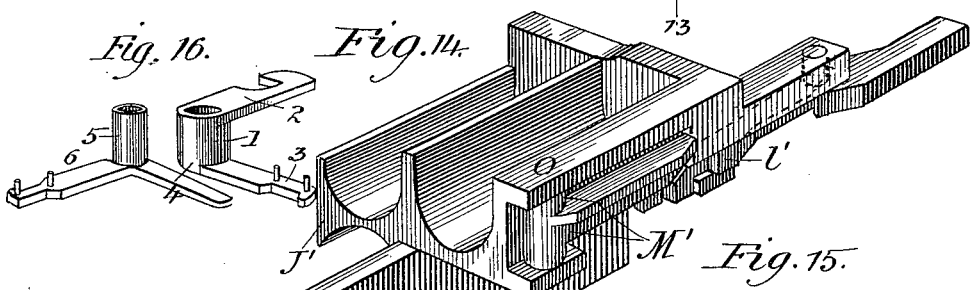
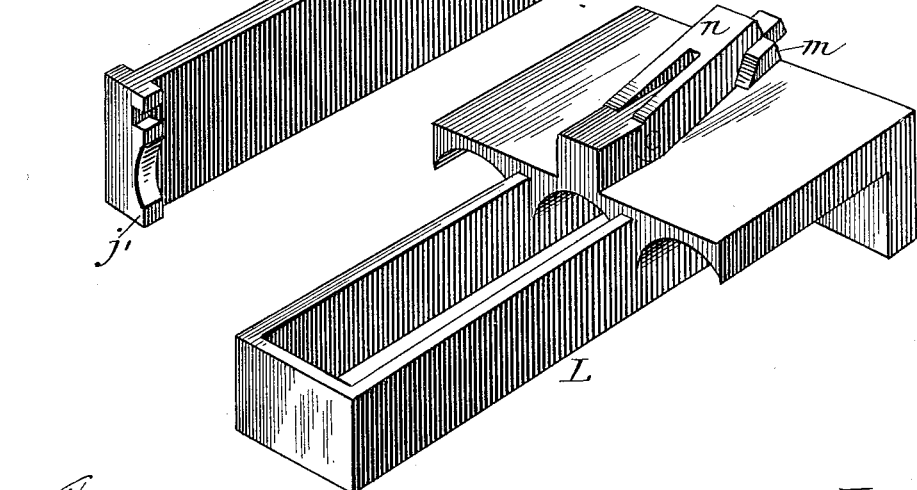
Witnesses:
Albert H. Adams.
Harry T. Jones.
Inventor:
Elbert W. Fowler.

(Model.)
E. W. FOWLER.
DEVICE FOR OPERATING SAFE BOLT WORK.
No. 403,527. Patented May 21, 1889.
6 Sheets—Sheet 6.
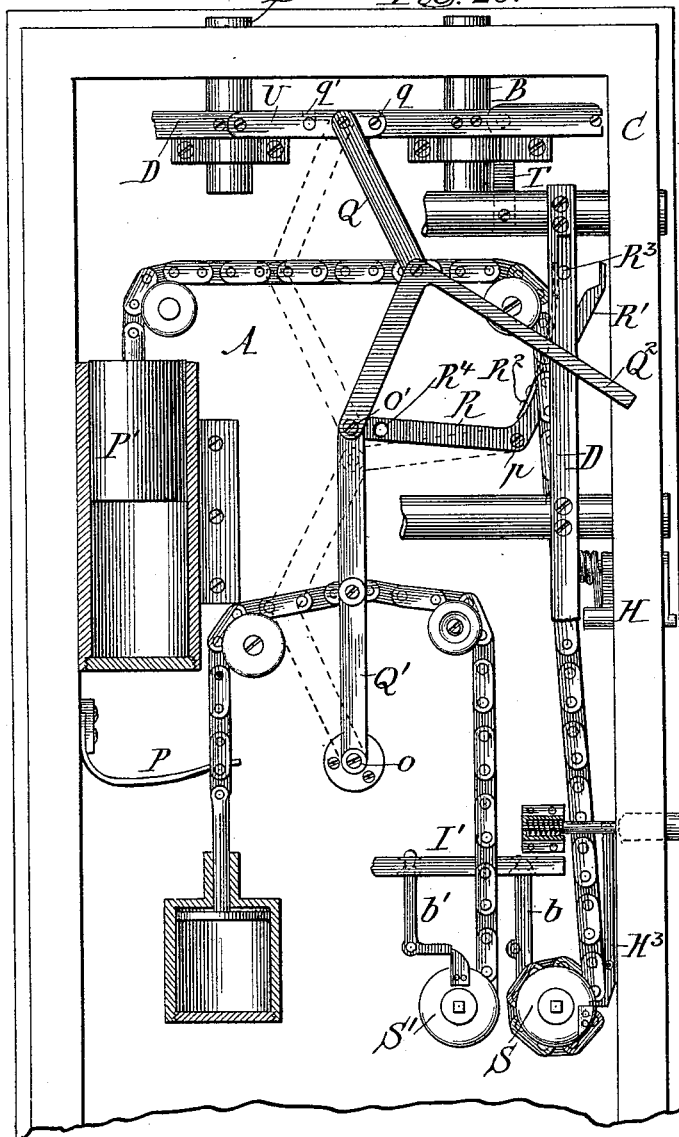
Fig. 20.
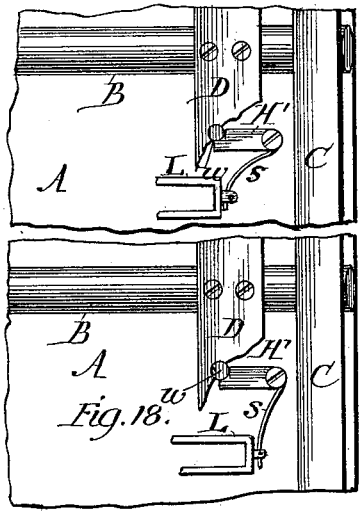
Fig. 17.
Fig. 18.
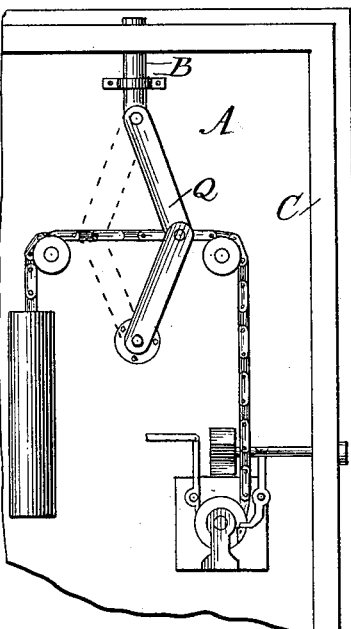
Fig. 19.
Witnesses:
Albert H. Adams
Harry T. Jones
Inventor:
Elbert W. Fowler

UNITED STATES PATENT OFFICE.

ELBERT W. FOWLER, OF CHICAGO, ILLINOIS, ASSIGNOR TO THE YALE & TOWNE MANUFACTURING COMPANY, OF STAMFORD, CONNECTICUT.

DEVICE FOR OPERATING SAFE BOLT-WORK.

SPECIFICATION forming part of Letters Patent No. 403,527, dated May 21, 1889.

Application filed May 7, 1888. Serial No. 273,049. (Model.)

*To all whom it may concern:*

Be it known that I, ELBERT W. FOWLER, residing at Chicago, in the county of Cook and State of Illinois, and a citizen of the United States, have invented new and useful Improvements in Devices for Operating Safe Bolt-Work, of which the following is a specification, reference being had to the accompanying drawings, in which—

Figure 1:
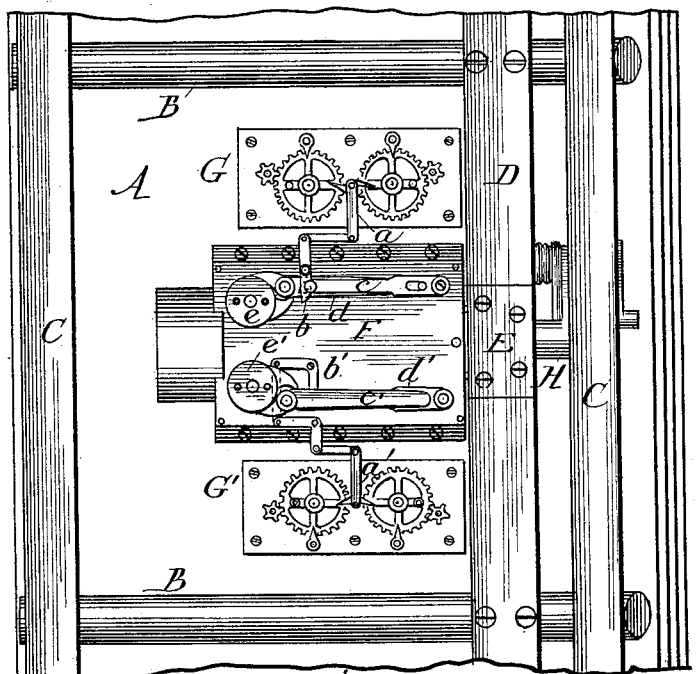
Figure 2:
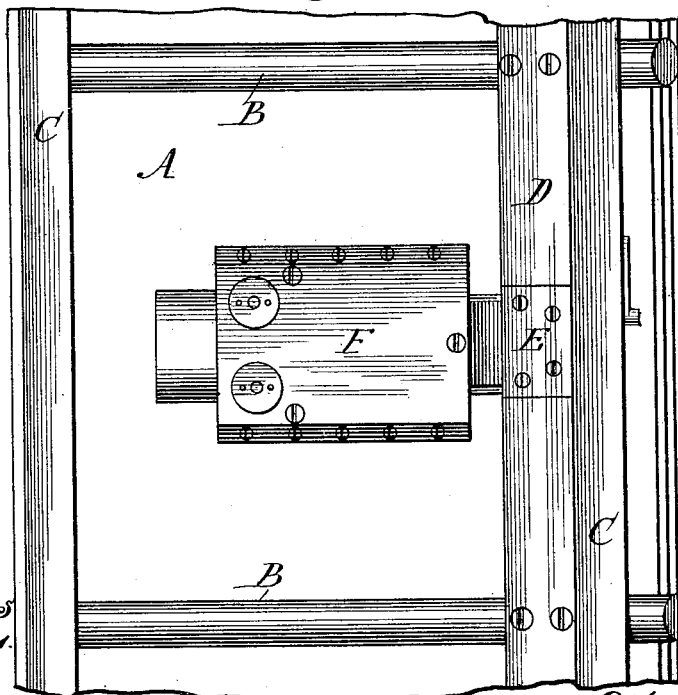
Figure 6:
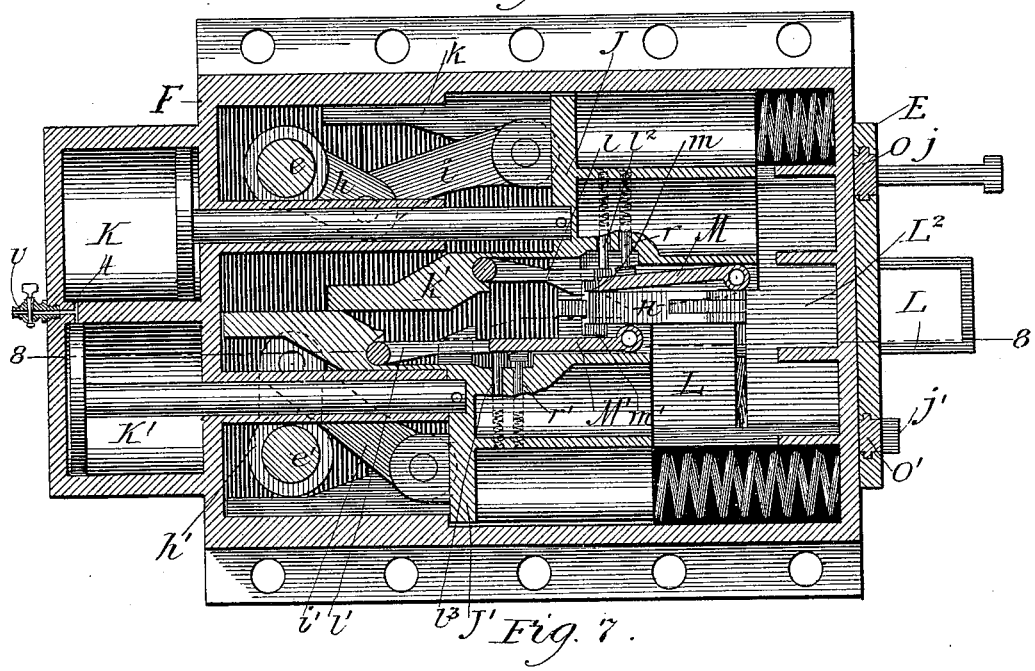
Figure 7:
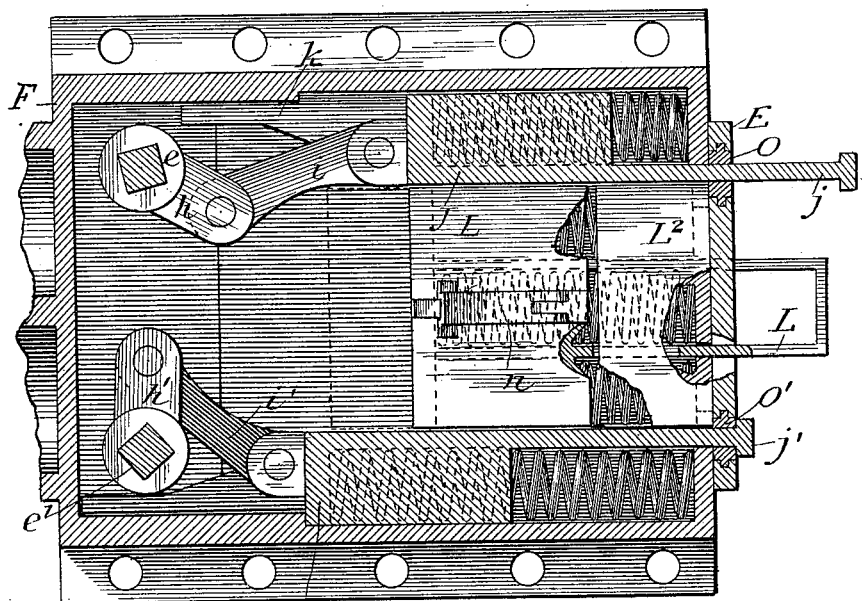

Figure 1 is an elevation showing part of the inside of a safe-door, also the case which contains the devices for automatically casting and retracting the bolts, the bolts being shown retracted; also two time mechanisms, as well as the devices which relate to the automatic casting and retracting the bolts. The bolts are in the position necessary for their operation before closing the door. The cases are removed from the time mechanisms, and the outer cover is removed from the case which contains the automatic casting and retracting devices. This figure illustrates how two automatic retracting-powers may be operated by separate time-movements independent of each other. Fig. 2 is an elevation showing the bolts in their locked position, the time mechanisms and their connections with the automatic devices being omitted, and the case which contains automatic devices having a cover. Fig. 3 is an elevation of the case containing the automatic devices for operating the bolt-work, the cover being removed. The levers connected with one of the retracting-powers are shown in their set position. The levers used in connection with the other retracting-power are shown in their unset posisition. This figure also illustrates how both of the retracting-powers may be operated by a single time-movement. Fig. 4 is a vertical longitudinal section, the place at which it is taken being indicated by line 4 in Figs. 9, 10, and 11. Fig. 5 is a cross-section taken through the air-cushions at line 5 of Fig. 3. Fig. 6 is a vertical longitudinal section taken at line 6 of Figs. 9, 10, and 11. Fig. 7 is a similar section taken at line 7 of Figs. 9, 10, and 11. Fig. 8 is a horizontal section taken at line 8 of Figs. 4 and 6, looking up. Fig. 9 is a cross-section at line 9 of Fig. 4, looking to the right. Fig. 10 is a cross-section at line 10 of Fig. 4, looking to the right. Fig. 11 is a cross-section at line 11 of Fig. 4, looking to the right. Fig. 12 is a detail, being a section of the parts shown, taken at the same place as is Fig. 8, showing the connection between the cases which contain the casting and retracting powers. Fig. 13 is a detail, being a section at line 13 of Fig. 12, looking to the right. Fig. 14 is a detail and is a perspective of a portion of the case which contains one set of retracting-springs and some parts connected therewith. Fig. 15 is a detail, being a perspective of a portion of the case which contains the casting-springs. Fig. 16 is a detail showing the upper detent, which is shown in Fig. 3, the two parts thereof being separated. Fig. 17 is an elevation showing a modified stop for holding the bolts retracted until the door is closed. Fig. 18 is similar to Fig. 17, the stop being shown in a different position. Fig. 19 is an elevation showing devices now in use and which are no part of my invention, which devices act on the bolt-work in both directions, while the power acts in only one direction. This figure, in connection with Fig. 20, illustrates the importance of my invention. Fig. 20 is an elevation of part of the inside of a safe-door, showing the devices shown in Fig. 19, with modifications to illustrate how additional powers may be used.

It is desirable to make the doors of safes without holes for locks and connections or handles to throw the bolts, and automatic devices have been used for casting the bolt-work, the bolts being cast when the door is closed and retracted by a power provided for that purpose when released through a time mechanism. Such automatic retracting mechanism or its connecting parts may get out of order, causing great annoyance and trouble.

The leading object of my invention is to provide against the defect mentioned, which I accomplish by providing two or more independent powers operated automatically, either of which will operate the bolts if the other from any cause fails to work. Other objects are to provide means for using such retracting-powers either together or separately, to provide means to prevent the power which casts the bolts from being used until both of the retracting-powers are set in position to retract the bolts, and to produce other useful results, as will hereinafter more fully appear.

The drawings illustrate, and my specification will describe in detail, the devices by means of which the objects of my invention are secured.

That which I claim as new will be succinctly specified in the claims.

In the drawings, A represents a portion of the inner part of a safe-door.

B are the bolts.

C is the bolt-frame.

D is a carrying-bar which connects the bolts.

E is an angle-iron secured to the bar D, and which forms a connection between the automatic casting and retracting devices and the bolt-work.

F is a case containing three sets of springs— three in each set. Two sets of springs are the retracting-powers and one set is the casting-power.

G G', Fig. 1, indicate two time mechanisms of ordinary construction.

$a\ a'$ are hooks or oscillating levers belonging to the time-locks, and are connected with detents $b\ b'$, which detents, through the levers $c\ d\ e\ c'\ d'\ e'$, respectively, hold the retracting-powers until released at the predetermined time.

H is a stop between the bar D and one part of the bolt-frame, as usual.

In Fig. 1 the two time-locks are shown, one in connection with each of the retracting-powers, which powers are not connected, but act independently of each other.

In the device shown in Fig. 3 a single time-lock is supposed to be used, and there is a connection between the two detents, and either one of the retracting-powers can be brought into action through the time-lock, or both can be operated simultaneously, or nearly so, by the same time-lock. In this Fig. 3 there are two detents, $b\ b'$, the office of which is substantially the same as that of the detents shown in Fig. 1; but the construction of these detents is somewhat different. The upper detent in Fig. 3 consists of two parts, (see Fig. 16,) one of which consists of the sleeve 1, the detent proper, 2, and an arm, 3, standing at right angles to the detent proper. The second piece consists of a sleeve, 5, which enters the sleeve 1, and an arm, 6, which extends upward, and the arm 4, which, acting under arm 3 by means of the connection with it, actuates sleeve 1 when arm C is moved by the time-movement. The sleeve 5 is supported on a pin or stud.

I is a link or rod, which connects the horizontal arms of the two detents. This link or rod is provided with two springs, $f f'$, and with two pins, $g\ g'$, located in the rod, one for each detent, and the rod or link is slotted for each detent to allow a little movement of one of the detents without disturbing the other while setting the automatic devices. The lower ends of the pins $g\ g'$ rest upon the ends of the horizontal arms of the detents.

I' is a link connected at one end with the hook or lever $a$ of the time mechanism, and at the other end with the upper end of the rod or link I, and is held in that position by a spring, $f^2$, and pin $g^2$, located in the arm I'. The upper end of the arm 6 of the detent $b$, Fig. 3, passes through a slot in the link I', which link can have a little horizontal movement sufficient to release it from the rod I before such link I' acts upon the detent $b$.

The link or rod I may be so arranged that it will move both detents simultaneously, or the times for releasing the detents may be different by making one of the arms of one detent longer than the corresponding arm of the other.

The levers $c$, $d$, and $e$ so interlock that they cannot be released by force other than that designed to be applied and used in the ordinary way. The lever $e$, Fig. 3, is cut away to show how it interlocks with the short arm of the lever $d$. The levers $c'\ d'\ e'$ interlock in a similar manner.

In Figs. 4, 6, and 7, the internal arrangement of the principal parts in case F are shown.

J is a movable piece in the main case, and is provided with pockets for three retracting-springs. It is connected with the lever $e$ by the crank $h$ and pitman $i$, and with the bolt-work through the projection $j$ and the slotted angle-iron E.

In Fig. 4 only one of the springs of each set of retracting-springs is shown. In this Fig. 4 the piece J is shown in its set position, the retracting-springs being compressed.

J' is a similar piece in all respects to J, and is for the same purpose. The retracting-springs contained in J' are not set in Fig. 4.

$k\ k'$, Fig. 6, are guides for the piece J. The piece J also acts as a guide.

The casting-springs are located in the part L. (See Figs. 7 and 8.) One end of the casting-springs rests against the end L' of the part L, and the other ends rest against the piece $L^2$. The walls of the main case, taken with the parts J J' L, form cases for the springs; but for the purposes of this specification the parts J J' L may be called "cases" for the springs.

$l$ is a pawl, which is pivoted to the case J. (See Fig. 6.)

$n$ is a dog pivoted or hinged to the case L. (See Figs. 6, 12, and 15.)

$m$ is a projection on one side of the dog $n$.

The pawl $l$ is arranged so as to engage with the projection $m$ on the dog $n$ when the case J is thrown forward, and when the dog is held in the position shown in Fig. 15, which can be done by a spring, $n'$, Fig. 12.

The case J' is provided with a pawl, $l'$, like $l$, and it is arranged to engage with a second projection, $m'$, Figs. 6 and 12, on the dog $n$ when the case J' is thrown forward. The pawls $l\ l'$ may be forced into the proper position to engage with the projections $m\ m'$ by springs, which are shown in dotted lines in Fig. 6, and act on pins $l^2\ l^3$.

Whatever retracting-power is set first will, through the pawl attached to it, engage with the dog $n$, and by the same motion set the casting-power. This might be done by fixed pawls on the cases J J'; but if all the powers should be set and one retracting-power should be released it would release the casting-power. To enable the released retracting and casting powers to be again set, the pawl $l$ or $l'$ must be moved to allow the projection $m$ or $m'$ on the dog $n$ to pass into the set position. Therefore I hinge the pawls $l\ l'$.

When the powers are all set, the casting-power will be held in its set position by the engagement of the pivoted pawls $l\ l'$ with the dog $n$. When one of the retracting-powers is released—for example, accidentally—the casting-power must also be released to permit the retraction of the bolts without having to overcome the power which cast them, which is accomplished as follows:

M, Figs. 4 and 6, is a lug pivoted at one end to the case J. The free end of this lug is beveled and may be forced by a spring, $r$, (shown in dotted lines, Fig. 6,) into position to engage with the front beveled end of the projection $m$ on the dog $n$, and when the retracting-power in the case J is released the dog $n$ will be forced down or back against the case L, and thus the casting-power will be released from the restraining action of the pawl $l'$ of the unreleased retracting-power. The hinged lug M is also provided with a flange, $M^2$, which serves to keep the dog $n$ in position. It also acts upon the piece N, secured to the main case, by which piece the lug M will be forced out of restraining contact with the dog $n$ when in the unset position.

M' is another lug like the lug M. Said lug M' is pivoted to the case J' and operates in all respects as does the lug M. In Fig. 4 this lug M' is shown in the unset condition and forced out of restraining contact with the dog $n$ by the piece N.

When lug M is in the unset condition, the dog $n$ can engage with the pawl $l$ to again set the casting-power. While it may not be necessary, I prefer to make the throw of the retracting-powers somewhat longer than the throw of the bolts, so that the engagement of the lug M with the dog $n$ may release the casting-power before the retracting-power commences to act upon the bolts to retract them.

O O', Figs. 4, 6, and 7, are slides in the angle-iron E. These slides are provided with slots, through which the projections $j\ j'$ from the cases J J' freely move in setting the retracting-powers. These slides O O' become, when in place, in fact a part of the angle-iron E. The heads of the projections $j\ j'$ act on the slides O O', retracting the bolts when the retracting-powers are released. If both retracting-powers are not set, the bolts cannot be cast without the casting-power being stronger than the retracting-power, which would be inexpedient. To provide for one complete casting and retracting power acting independently of the other retracting-power, I have provided these slides O O'. If one of them be removed, the retracting-power connected therewith cannot be used, because the head on the projection $j$ or $j'$ would not act upon the angle-iron E.

The stop H, Figs. 1, 2, and 8, holds the bolts retracted until the projecting end comes in contact with the jamb of the door or other part upon closing the door, and then the bolts will be released in the usual manner.

In Fig. 17 I have provided a stop that works by the snubbing action of the ends of the bolts, which may be slightly beveled, acting upon the door-jambs.

H', Figs. 17 and 18, is a stop pivoted to the door and acting against the carrying-bar D through a pin, $w$, provided for that purpose.

The stop H' is provided with a spring, $s$, acting in two ways, its normal position being half-way between the set and unset positions of the part L, which projects from the casting-spring case J, to which the spring is loosely attached. When part L is in the unset position, (see Fig. 17,) the action of this spring is to throw stop H' in contact with the bar D. When L is set, (see Fig. 18,) the spring would throw H' out of contact with bar D if the casting-power did not, by setting, press bar D against stop H' so closely that the friction of the pin $w$ against the stop will hold it in engagement until the snubbing of the bolts retracts them sufficiently to release H' and allow its spring to take it out of the restraining influence upon the bolts.

K, Figs. 4, 5, and 6, is a cushion consisting of a chamber, piston, and piston-rod, which is connected with the case J. This cushion may be of the air-pump variety, or filled with a liquid. The escape of air or liquid may be around the piston-head. The object is to cushion the moving parts from too violent or sudden shock, which might have a tendency to damage the mechanism. K' is another cushion. There is a passage, $t$, connecting the two cushion-chambers.

$v$ is a petcock communicating with the passage $t$.

The operation is as follows: Suppose a banker is ready to close the safe, the door being open and the bolts retracted, and the automatic devices and time mechanisms in their normal positions. The operator sets the time mechanisms as usual. He will then, by the use of any suitable setting wrench or lever (not shown) applied at $e^4$, bring the lever $e$ into the set position, which action will set the levers $c\ d$, and the whole will be held in the set position by the detent $b$. The setting-lever being then applied to the lever $e'$ at $e^5$, the levers $c'\ d'$ can be set, and will be held in their set position by the detent $b'$, as shown in Fig. 1. All the spring-powers for casting and retracting the bolts will be in tension for action; but the bolts will be held in a retracted position by the stop H or H', Figs. 1 and 17, until the door is closed, when the stop will, by the act of closing the door, be moved out of the path of the bolts, and they will be cast by the spring-power provided for that purpose. Suppose the safe to have been closed for the night, as described. The action of the time mechanisms after a given time— say sixteen hours—will release the detent from the compound levers, and thereby release the retracting-powers, which will then retract the bolts. The first retracting-power released, whatever cause may detain the other, will, by its first motion toward retraction by the impinging of the hinged lug M, Figs. 4 and 6, upon the projection $m$ or $m'$ of the hinged dog $n$, force this dog down out of restraining contact with the hinged pawl $l$ or $l'$, attached to the case of the unreleased retracting-power, and thus released the casting-power will, with its case, be retracted with the bolts. The other retracting-power, when released, will come to its normal position with great force, having no bolts to move. The cushions K and K', I have provided for such a contingency. I vary the resistance of the retracting-powers by fitting the pistons for but little escape of the contents of the chambers—air, for instance. A single retracting-power would hardly be enough to work the bolts and cushion; but by providing an opening, $t$, between the cylinders I can make a proper equilibrium between the cushion, the power, and the work it has to perform. I provide for closing the connection between the cylinders by the piston of either power when it is retracted, and thereby offer increased cushioning resistance to the other retracting-power as it comes to an unset position with no work to do, the bolts having been already retracted. If both retracting-powers come back together, they in part balance each other through the connection between the cylinders, and leave only a proper amount of power to do the work required. Of course, if only one casting and one retracting-power is to be used, a provision must be made for escaping air other than into the unused or closed cylinder. This can be done by a petcock, $v$, Fig. 6, or other well-known means, which will regulate the opening for the escape of air when only one cushion and power are used.

In Fig. 19 I have shown a device now in use for casting and retracting bolts, consisting of a toggle-lever for operating the bolts, and a weight which both casts and retracts the bolts, the weight constantly acting in one direction and throwing the toggle-lever to the center to cast the bolts and from the center to retract the same. In this figure the time mechanism is not shown, but is to be applied in any well-known manner.

If the toggle-levers do not pass to the center in casting the bolts, being prevented by friction of the bolts or any obstacle that prevents them from passing to their full forward throw, they cannot be retracted by the power provided for that purpose. My improvements are specially adapted to overcome this defect.

In Fig. 20 an additional retracting-power is provided, which may be a spring, P, or another weight, like P'. This additional retracting-power is applied in this instance through the additional toggle-levers Q', with one end, $o$, pivoted to the door, the other, $o'$, being pivoted to an oscillating lever, R, which is pivoted to the door at $p$. The toggle-levers Q are at the upper end pivoted to the carrying-bar D, as usual, and at the other end to the lever R. The chain by which the power is applied to cast and retract the bolts has one end attached to the setting-wheel S, which is held in a set position by the stop $H^3$ until, upon closing the door, the stop comes in contact with the door-jamb and the bolts are released thereby from stop $H^3$ and cast by the weight P', bringing the toggle-levers Q to their centers, the restraint of the wheel S being shifted from stop $H^3$ to the detent $b$. The additional retracting-power P can be set by setting the toggle-levers Q' on or near their centers, and is held in that position by the wheel S' and detent $b'$. The detents $b$ and $b'$ may be connected by a link, I', which may be connected to a time mechanism or mechanisms in the manner shown and described in Fig. 3 or Fig. 1, or in any other convenient manner. When the detent $b$ releases the power P', the toggle-levers Q pass to the position indicated by the dotted lines, thereby retracting the bolts. If the toggle-levers Q are held on the center by the detent $b$, and the power P is released from its detent $b'$, the toggle-levers Q' will pass to the position indicated by the dotted lines and retract the bolts through the toggle-levers Q. This motion is permitted by the oscillating lever R. In this figure I have also shown how two casting-powers can be used together or separately, and how, if both are provided, one may be used independently of the other either with one or both retracting-powers. The vertical and horizontal bolts may be connected in a well-known way by a bell-crank, T, so that the vertical bolts will move the horizontal bolts, or, vice versa, simultaneously with their own motion.

The ends of the toggle-levers Q are attached to the carrying-bar D by an intermediate oscillating bar, U, pivoted at one end to the carrying-bar, and at the other end secured by a movable screw, $q$. By moving this screw $q$ to the hole $q'$ in the bar U the end of the bar is freed from the carrying-bar at that end, and by a notch cut in the carrying-bar (indicated by dotted lines near $q'$) the bar U is permitted a forward or upward motion without moving the carrying-bar. This would cut off the power P' from casting the bolts, but would allow it to retract them when cast, through the engagement of the screw in the hole $q'$, acting on the carrying-bar D. To remove the screw $q$ altogether would disconnect the power P' from any action on the bolts. The same method of attachment might be applied to the horizontal bolts.

The bolts can be cast and retracted with the other powers provided by means of the retracting-power P and toggle-levers Q' acting on the oscillating lever R. This lever has an arm, R', and a spring, $R^2$, which act upon a sliding stud, $R^3$, attached to the carrying-bar D. When the oscillating lever R is put into the position shown in the drawings by the setting of the retracting-power P, the spring $R^2$ is pressed against the stud $R^3$ and casts the bolts upon the closing of the door, the bolts being then released from the stop H. The release of the retracting-power P by the removal of the restraining-detent $b'$ moves the oscillating lever R to the position shown in dotted lines, and the arm R', acting on the sliding stud $R^3$, retracts the bolts. If the casting-power $R^2$ is not desired, the sliding stud $R^3$ can be moved out of contact therewith. When the retracting-powers are used with the casting-power $R^2$, the screw $q$ in the oscillating bar U must be moved to the hole $q'$ and both retracting-powers set. The power $R^2$ casts the bolts. Both sets of toggle-levers are in position to act to retract. If the power P' acts, the arm $Q^2$ of the toggle-lever Q will engage the sliding stud $R^3$ and move it out of contact with the casting-power $R^2$, and then will pass to the unset position, the power P' retracting the bolts.

If the power P' is to be used alone, the oscillating bar U is to be secured to the carrying-bar D by the screw $q$, and the end $o'$ of the toggle-lever Q is to be fixed in the position shown in the drawings by putting a screw through the oscillating lever R at $R^4$, securing the lever to the door in a fixed position, and the sliding stud $R^3$ is to be removed.

I do not limit myself to two retracting-powers or one casting-power, or to the number of springs in each power, or to springs, or to the details of construction herein contained, as it is obvious that the spirit of the invention may be employed with varied details or arrangements not set out above.

What I claim as new, and desire to secure by Letters Patent, is—

1. In an apparatus for operating safe bolt-work, the combination, with the bolt-work, of two independent automatic retracting-powers adapted independently or simultaneously to retract the bolt-work, substantially as set forth.

2. In an apparatus for operating safe bolt-work, the combination, with the bolt-work, of two independent automatic retracting-powers adapted independently or simultaneously to retract the bolt-work and a time mechanism for tripping or releasing the retracting-powers, substantially as set forth.

3. In an apparatus for operating safe bolt-work, the combination, with the bolt-work, of two independent automatic retracting-powers adapted independently or simultaneously to retract the bolt-work, in combination with a casting-power, substantially as set forth.

4. As an improvement in devices for automatically operating the bolts of a safe or vault door, two automatic retracting-powers, in combination with two time mechanisms, each arranged to operate one of the retracting-powers independently of the other, substantially as set forth.

5. In an apparatus for operating safe bolt-work, the combination, with the bolt-work, of two automatic retracting-powers applied to the bolt-work to retract it, a casting-power applied to the bolt-work to cast it, and a lug secured to the case of the retracting-springs, adapted to trip and release the fastening of the casting-power whenever the retracting-power is released, substantially as set forth.

6. As an improvement in devices for automatically operating the bolts of a safe or vault door, two automatically-acting retracting-powers, which may be separately released to retract the bolts, in combination with a system of interlocking compound levers and detents arranged to hold the retracting-powers in check until released at a predetermined time by the power provided for that purpose.

7. The combination of detents for holding the automatic retracting-powers for operating safe bolt-work in check until such predetermined time as they are to be released, and an interlocking connection between the detents and time mechanism that will have to be released by the time mechanism before the time mechanism moves the detents to release the power that is provided to automatically retract the bolts of a safe or vault door.

8. As an improvement in devices for automatically operating the bolts of a safe or vault door, two automatically-acting retracting-powers, in combination with a casting-power and mechanism that will enable the setting of either retracting-power to set the casting-power that is provided to cast the bolts.

9. As an improvement in devices for automatically operating the bolt-work of a safe or vault door, two automatic retracting-powers, in combination with a casting-power and pawl $l$, case J, dog $n$, and case L, to enable the casting and one retracting-power, when released, to be again set without releasing the other retracting-power, substantially as set forth.

10. In a device for the automatic operation of safe bolt-work, the combination of two cushions and two automatic retracting-powers with a cock or equivalent connection between them to adjust the resistance of the cushion to the work either power has to perform, substantially as set forth.

ELBERT W. FOWLER.

Witnesses:
 ALBERT H. ADAMS,
 HARRY T. JONES.